United States Patent
Cody et al.

(10) Patent No.: US 11,714,491 B2
(45) Date of Patent: Aug. 1, 2023

(54) DEVICE AND METHOD FOR GENERATING HAPTIC FEEDBACK ON A TACTILE SURFACE

(71) Applicant: Huawei Technologies Co., Ltd., Shenzhen (CN)

(72) Inventors: Roya Cody, Toronto (CA); Alice Jing Fei Liang, Toronto (CA); Da-Yuan Huang, Toronto (CA); Wei Li, Toronto (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/303,730

(22) Filed: Jun. 7, 2021

(65) Prior Publication Data

US 2022/0391016 A1 Dec. 8, 2022

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 3/04142* (2019.05)

(58) Field of Classification Search
CPC .... G06F 3/016; G06F 3/0412; G06F 3/04142; G06F 2203/014; G08B 6/00; A63F 13/285; B06B 1/00
See application file for complete search history.

(56) References Cited

U.S. PATENT DOCUMENTS

| | | | | |
|---|---|---|---|---|
| 2011/0267181 | A1* | 11/2011 | Kildal | G06F 3/041 345/173 |
| 2013/0335209 | A1* | 12/2013 | Cruz-Hernandez | G08B 6/00 340/407.1 |
| 2018/0011538 | A1* | 1/2018 | Rihn | G06F 3/016 |
| 2018/0164885 | A1* | 6/2018 | Cruz-Hernandez | G06F 3/0346 |
| 2018/0224940 | A1* | 8/2018 | Matsumoto | G06F 1/1626 |
| 2020/0081543 | A1 | 3/2020 | Vezzoli et al. | |

FOREIGN PATENT DOCUMENTS

| | | |
|---|---|---|
| CN | 109005268 A | 12/2018 |
| WO | 2020179128 A1 | 9/2020 |

OTHER PUBLICATIONS

Kildal, Johan. "3d-press: haptic illusion of compliance when pressing on a rigid surface." International Conference on Multimodal Interfaces and the Workshop on Machine Learning for Multimodal Interaction. 2010. Article 21. (8 pages). Association for Computing Machinery. NY, USA.

(Continued)

*Primary Examiner* — Temesghen Ghebretinsae
*Assistant Examiner* — Ivelisse Martinez Quiles
(74) *Attorney, Agent, or Firm* — Slater Matsil, LLP

(57) ABSTRACT

A method, a feedback-enabled device and a computer-readable memory are provided, for generating haptic feedback. The actuators of a tactile surface are vibrated for producing vibration bursts based on a sequence of an adaptive friction grain signal. The adaptive friction grain signal comprises a plurality of grains corresponding to the vibration bursts, each grain being defined by an amplitude. The adaptive friction grain signal has a grain density that is variable over the sequence.

18 Claims, 10 Drawing Sheets

(56) References Cited

OTHER PUBLICATIONS

Kim, Sunjun, and Lee, Geehyuk. "Haptic feedback design for a virtual button along force-displacement curves." Proceedings of the 26th annual ACM symposium on User interface software and technology. 2013. pp. 91-96 (6 pages). Association for Computing Machinery. NY, USA.
Okamoto Shogo; Nagano, Hikaru; Yamada, Yoji. "Psychophysical dimensions of tactile perception of textures". IEEE Transactions on Haptics 6.1. 2012. pp. 1-13. IEEE.
Strohmeier, Paul; Hornbaek, Kasper. "Generating haptic textures with a vibrotactile actuator". Proceedings of the 2017 CHI Conference on Human Factors in Computing Systems. 2017. pp. 4994-5005 (12 pages). Association for Computing Machinery. NY, USA.
Liao, Yi-Chi; Kim, Sunjun; Lee, Byungjoo; Oulasvirta, Antti "Button Simulation and Design via FDVV Models". Proceedings of the 2020 CHI Conference on Human Factors in Computing Systems. 2020. pp. 1-14 (14 pages). Association for Computing Machinery. NY, USA.
Heo, Seongkook, and Lee, Geehyuk. "Vibrotactile compliance feedback for tangential force interaction." IEEE transactions on haptics 10.3. 2016. pp. 444-455.
Heo, Seongkook, Lee, Jaeyeon, and Wigdor, Daniel. "PseudoBend: Producing haptic illusions of stretching, bending, and twisting using grain vibrations." Proceedings of the 32nd Annual ACM Symposium on User Interface Software and Technology. 2019. pp. 803-813.
Wu, Juan; Li, Na; Liu, Wei; Song, Guangming; Zhang, Jun. "Experimental study on the perception characteristics of haptic texture by multidimensional scaling". IEEE Transactions on Haptics 8.4. 2015. pp. 410-420. IEEE.

\* cited by examiner

DEVICE AND METHOD FOR GENERATING HAPTIC FEEDBACK ON A TACTILE SURFACE

TECHNICAL FIELD

The present application relates to the field of haptic technologies and more particularly relates to a device and a method that provide realistic vibrotactile feedback.

BACKGROUND

With the rise of interactive technologies such as touch displays, interactions between users and tactile surfaces have become ubiquitous. As an example, most smartphones provide a touch display as the main means for interacting with a user.

However, unlike interacting with a physical widget or device, where haptic feedback is inherently generated from physically interacting with the physical widget, interacting with tactile surfaces, which are often rigid and motionless surfaces, provide minimal, if any, haptic feedback. Particularly, kinetic and cutaneous sensory stimuli, present when interacting with a physical widget, are mostly absent when interacting with a tactile surface or a virtual widget.

There exist different methods for generating haptic feedback on tactile surfaces, which involve the triggering of vibro-tactile actuators in response to a force being detected on the surface. However, the haptic feedback generated from existing methods fails to provide haptic perceptions which realistically mimic the feedback inherently generated when interacting with a physical widget or device. Furthermore, the haptic feedback generated from such methods is generic.

There is therefore a need for a method and a device for generating haptic feedback that creates an improved illusion of displacement on a tactile surface, thereby improving the feedback perception.

SUMMARY

According to a first aspect, a method for generating haptic feedback on tactile surface is provided. The method comprises vibrating the tactile surface by producing vibration bursts based on a sequence of an adaptive friction grain signal. The adaptive friction grain signal comprises a plurality of grains corresponding to the vibration bursts, with each grain being defined by an amplitude. The adaptive friction grain signal has a grain density that is variable over the sequence, with the density corresponding to the number of grains during a given time interval. The method may be advantageously applied to a feedback-enabled device comprising a processor and the tactile surface, where the tactile surface is provided with actuators used to produce the vibration bursts. A more complete and complex haptic feedback can be produced by having the grain density, and corresponding vibration bursts, vary during a given sequence, which represents more realistically the feedback that would be felt by a user when interacting with a physical widget.

According to an embodiment of the first aspect, the method further comprises a step of determining a force exerted on the tactile surface, which allows adapting the generated haptic feedback as a function of the determined force. The method also comprises a step of comparing the force to an initial force threshold. The step of vibrating of the tactile surface is performed when the force exceeds the initial force threshold. According to an embodiment, the tactile surface of the feedback-enabled device comprises force sensors, and the step of determining the force comprises measuring, by the force sensors, the force exerted on the tactile surface.

According to some examples, the adaptive friction grain signal is modeled using previously acquired force-displacement data representing a magnitude of force exerted for displacing a physical widget, and vibration-displacement data representing vibrations generated from displacing the physical widget. The grain density of the adaptive friction grain signal is derived from the force-displacement data and the grain amplitude is derived from the vibration-displacement data. This advantageously allows generating haptic feedback that is representative of the feedback that would be felt when interacting with a physical widget, thereby providing improved realism for the user.

According to some examples, the adaptive friction grain signal causes the actuators to mimic different phases of the physical widget displacement, including a jump phase, which may further increase the realism and/or feedback produced by a tactile surface.

According to some examples, the vibrating of the tactile surface comprises calculating, a velocity corresponding to a speed of an object exerting the force on the tactile surface and derived from the force on the tactile surface. The vibrating of the tactile surface further comprises adjusting a duration of the sequence based on at least one of the force and the calculated velocity, the duration corresponding to a time interval during which the vibration bursts of the sequence are produced. For example, the sequence can be played or actuated more rapidly if a user presses with more velocity on the tactile surface, which further increases the realism of the feedback produced by actuators of the tactile surface.

According to some examples, the duration is adjusted proportionally to at least one of the force and the calculated velocity.

According to some examples, the sequence of the adaptive grain signal is scaled as a function of the calculated velocity, prior to producing the vibration bursts.

According to some examples, the grains of the sequence are each associated with respective gradually increasing force thresholds. The vibrating of the tactile surface comprises producing the vibration burst of a given grain of the sequence when the force exceeds the force threshold associated with the given grain.

According to some examples, the method comprises pausing the vibrating of the tactile surface when the force falls below the initial force threshold but is greater than a minimum threshold and resuming the vibrating of the tactile surface when the force raises above the initial force threshold.

According to some examples, the method comprises stopping the vibrating of the tactile surface when the force is less than the initial force threshold.

According to some examples, each grain is further defined by at least one of a frequency, a timbre, a decay type, a decay time and a decay amount, so as to provide a haptic feedback distinctive of a given type of physical widget, out of a plurality of physical widget types.

According to some examples, the grain density of the sequence is different before the jump phase from the grain density after the jump phase. Advantageously, this provides a sensation of increasing resistance as the tactile surface is being pressed.

According to some examples, the grain density of the sequence corresponding to a bottom-out phase is different from the grain density of an upstream portion of the sequence.

According to a second aspect, a feedback-enabled device for generating haptic feedback is provided. The feedback-enabled device comprises a tactile surface provided with actuators for vibrating the tactile surface by producing vibration bursts. The feedback-enabled device also comprises a non-transitory readable memory for storing data representative of an adaptive friction grain signal. The adaptive friction grain signal comprises a plurality of grains corresponding to the vibration bursts, with each grain being defined by an amplitude. The adaptive friction grain signal has a grain density that is variable, with the density corresponding to the number of grains over a given time interval. The feedback-enabled device further comprises a processor operatively connected to the actuators and to the non-transitory readable memory. The memory comprises executable instructions stored thereon which, when executed, cause the processor to send a sequence of the adaptive friction grain signal to the actuators to produce the vibration bursts based on the sequence.

According to an embodiment of the second aspect, the tactile surface is further provided with sensors for determining a force exerted on the tactile surface. The processor is operatively connected to the sensors. The memory further comprises instructions to cause the processor to compare the force to an initial force threshold, and to send the sequence of the adaptive friction grain signal when the force exceeds the initial force threshold. According to an embodiment, the sensors are force sensors for measuring the force exerted on the tactile surface.

According to some examples, the adaptive friction grain signal can be derived from previously acquired force-displacement data representing a magnitude of force exerted for displacing a physical widget, and from previously acquired vibration-displacement data representing vibrations generated from displacing the physical widget. The grain density is derived from the force-displacement data and the grain amplitude is derived from the vibration-displacement data. In yet other embodiments, the friction grain signal can be created from scratch, without being based on a physical widget, while still including a variable grain density.

According to some examples, the adaptive friction grain signal causes the actuators to mimic different phases of the physical widget displacement, including a jump phase.

According to some examples, the memory further comprises instructions to cause the processor to calculate a velocity corresponding to a speed of the object exerting the force on the tactile surface, the velocity being derived from the force, and to adjust a duration of the sequence based on the calculated velocity. The duration corresponds to a time interval during which the vibration bursts of the sequence are produced.

According to some examples, the duration of the sequence is proportional to at least one of the force and the calculated velocity.

According to some examples, the grains of the sequence of the adaptive friction grain signal and stored in the memory are each associated with respective gradually increasing force thresholds. The memory further comprises instructions to cause the processor to send a segment of the signal comprising a given grain when the force exceeds the force threshold associated with said given grain.

According to some examples, wherein the memory further comprises instructions to pause activation of the actuators when the force falls below the initial force threshold but is greater than a minimum threshold, and to resume the activation of the actuators when the force raises above the initial force threshold.

According to some examples, the force sensors and the actuators of the feedback-enabled device are combined in piezo-actuators which combine functions of force measurement and surface vibration.

According to some examples, the haptic feedback generated by the feedback-enabled device creates a sensation of depth as would be felt from displacing the physical widget.

According to a third aspect, a non-transitory computer-readable medium is provided, having stored thereon computer-readable instructions for generating haptic feedback on a feedback-enabled device comprising a processor and a tactile surface provided with actuators. The computer-readable instructions cause the processor to send an adaptive grain signal to the actuators for vibrating the tactile surface by producing vibration bursts based on a sequence of the adaptive friction grain signal. The adaptive friction grain signal comprises a plurality of grains corresponding to the vibration bursts, with each grain being defined by an amplitude. The adaptive friction grain signal has a grain density that is variable over the sequence, with the density corresponding to the number of grains during a given time interval.

According to an embodiment of the third aspect, the non-transitory computer-readable medium further comprises instructions to cause the processor to compare a force exerted on the tactile surface to an initial force threshold, and to send the adaptive grain signal to the actuators only when the force exceeds an initial force threshold.

According to some examples, the non-transitory computer readable medium the adaptive friction grain signal is modeled using previously acquired force-displacement data representing a magnitude of force exerted for displacing a physical widget, and previously acquired vibration-displacement data representing vibrations generated from displacing the physical widget. The grain density of the adaptive friction grain signal is derived from the force-displacement data and the grain amplitude is derived from the vibration-displacement data.

According to another aspect, a method of generating an adaptive friction grain signal for producing haptic feedback on a feedback-enabled device is provided. The method comprises receiving force-displacement data representing a magnitude of force exerted for displacing a physical widget over a given distance. The method also comprises receiving vibration-displacement data representing vibrations generated from displacing the physical widget over the distance. The method comprises converting the force-displacement data and the vibration-displacement data into the adaptive friction grain signal. The adaptive friction grain signal comprises a plurality of grains, the grains corresponding to vibration bursts to be played by actuators of the feedback-enabled device. Two successive grains are spaced apart by a given period, and each grain is defined by an amplitude. The period between two successive grains is function of the force magnitude extracted from the force-displacement data, such that a grain density of the signal, corresponding to a number of grains over a given time interval, is variable. The amplitude of each grain is function of an envelope extracted from the vibration-displacement data. The adaptive friction grain signal mimics different phases of the physical widget displacement, where the amplitude and density of the grains define a jump phase. A haptic feedback, generated on the tactile surface based on a sequence of the adaptive friction grain signal, creates a sensation of depth as would be felt from displacing the physical widget.

As can be appreciated, the proposed method, device and non-transitory memory advantageously improve the haptic feedback produced when a user interacts with a tactile surface by automatically generating a more complete and complex haptic feedback. The adaptative friction grain signal, having a variable grain density, is more representative of the feedback that would be felt by a user interacting with a physical widget. The adaptive friction grain signal is more complete and authentic compared to existing methods that are based on static vibration models.

It will be understood that even though only some of the embodiments of the present application are described, any combination of the different embodiments is possible. Further, the various steps of the method can be carried out in any order without departing from the present application.

BRIEF DESCRIPTION OF THE DRAWINGS

FIG. 2a is a representation of a first displacement position of a physical widget.

FIG. 2b is a representation of a second displacement position of the physical widget of FIG. 2a.

FIG. 2c is a representation of third displacement position of the physical widget of FIG. 2a.

DETAILED DESCRIPTION

Figure 1:
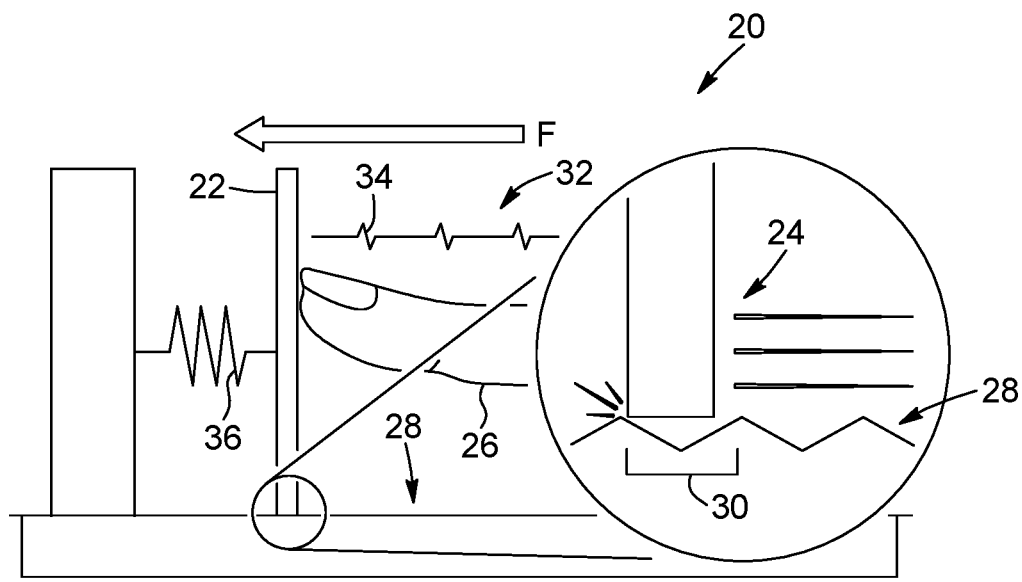
FIG. 1 is a graph representing a friction grain model.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments and/or geometrical configurations shown in the figures or described in the present description are embodiments only, given solely for exemplification purposes.

Moreover, although the embodiments described herein and presented throughout FIGS. 3 to 14 are particularly suited for generating haptic feedback on a feedback-enabled device having a tactile surface, such as a smartphone, the embodiments described are provided as non-limitative examples only. The method and device described herein may be adapted for use in devices of different applications, such as in force sensitive virtual-reality controllers or feedback-enabled steering wheels, without departing from the scope of the present application.

In general terms, the present application describes a method and a device for generating an adaptive haptic feedback, representative of the feedback inherently produced when interacting with a physical widget. The device described herein, referred to as a haptic-enabled device, is configured to generate an adaptive haptic feedback when a user interacts with the tactile surface of the device. One of the advantages of the present method and device is the automated generation of a more complete and complex haptic feedback, which represents more realistically the feedback that would be felt by a user when interacting with a physical widget. In other words, the generated adaptive haptic feedback mimics the haptic feedback produced when a physical widget is displaced or pressed on.

Broadly described, a method for generating haptic feedback on a tactile surface is provided. The method comprises vibrating the tactile surface by producing vibration bursts based on a sequence of an adaptive friction grain signal. The adaptive friction grain signal comprises a plurality of grains corresponding to the vibration bursts. Each grain is defined by an amplitude, and the adaptive friction grain signal has a grain density, corresponding to the number of grains during a given time interval, that is variable over the sequence.

The adaptive haptic feedback is therefore generated by producing vibration bursts based on an adaptive friction grain signal. The adaptive friction grain signal, in a non-limiting embodiment, is automatically modeled based at least in part on displacement data acquired from a physical widget.

In the following description, the term "feedback-enabled device" refers to any device which can generate haptic feedback in response to interactions with a user. Such a feedback-enabled device can include a smartphone, a tablet, a computer mouse, a virtual keyboard, a control panel of a smart refrigerator, or any other suitable device. A feedback-enabled device comprises a tactile surface provided with force sensors and vibrotactile actuators, one or more processors and a non-transitory readable memory.

The term "tactile surface" refers to any surface allowing for interacting with a user using touch commands. For example, a tactile surface may be a touch display on a smartphone or tablet, a self-checkout panel at a grocery store, or a self-ordering panel at a restaurant. The tactile surface may comprise virtual buttons, sliders, or any other widget for interacting with the user.

The term "vibro-tactile actuator", or simply "actuator", refers to any device capable of generating vibrations for creating haptic feedback on a surface. The term "actuator" can also refer to miniaturized motors capable of generating vibrations.

The term "haptic feedback" refers to a touch sensation or response that can be experienced by a user interacting with an object. For example, pressing a key of a physical keyboard or pressing a doorbell produces an inherent haptic feedback for the user. In the following description, haptic feedback also refers to a touch response generated by actuators and sensed by the user.

The term "physical widget" refers to any type of physical button or switch, such as push buttons, selector switches and toggle switches, and more broadly to any kind of object or device which can be physically and manually interacted with.

The adaptive haptic feedback according to the non-limiting embodiments described herein is generated from an adaptive friction grain signal, for producing vibrations representative of haptic feedback produced when displacing a physical widget.

The adaptive friction grain signal comprises friction grains, which correspond to vibration bursts. The sequence of vibration bursts mimics the haptic feedback felt when displacing a physical widget. The adaptive friction grain signal advantageously includes a variable grain density and varying grain amplitudes, allowing for creating haptic feedback that is representative of the feedback produced from the displacement of a physical widget. In a non-limiting embodiment, the adaptive friction grain signal is used to create an illusion of depth on a tactile surface, which is typically rigid.

When a user presses or displaces a physical widget, inherent haptic feedback in the form of kinesthetic and cutaneous cues is felt by the user. The haptic feedback generated from the displacement of the physical widget is generally predominantly a kinesthetic cue accompanied by various cutaneous cues.

In a possible embodiment, the adaptive friction grain signal generates a haptic feedback that mimics at least the cutaneous cues generated from the displacement of a respective physical widget. Accordingly, one of the advantages of the method and device described herein is to create an illusion of displacement as the user associates the cutaneous cues with the kinesthetic cues generated from displacing the respective physical widget.

The general idea of friction grain signal is illustrated by the friction grain model 20 shown in FIG. 1.

A conceptual button 22 is displaced along a surface 28 by applying a force F thereon. A resistive force, represented by a spring 36, is acting against the displacement 24 of the conceptual button 22. Therefore, the force F can be varied to further displace the conceptual button 22. The surface 28 is not completely smooth, and therefore presents a texture with bumps, or dents, representing discrete grains 30. When the button 22 is displaced along the surface 28, haptic feedback 32 is generated and can be felt by a displacing object 26 (such as a finger) applying the force F to the button 22. The haptic feedback 32 can be represented as a sequence of a plurality of vibration bursts, or friction grains 34, each corresponding to a burst of vibrations created from displacing the button 22 over a discrete grain 30.

A friction grain signal produced by conventional means has traditionally included at least one key parameter that is fixed. For example, a traditional friction grain signal may be played in set intervals.

Figures 2A, 2B, 2C:
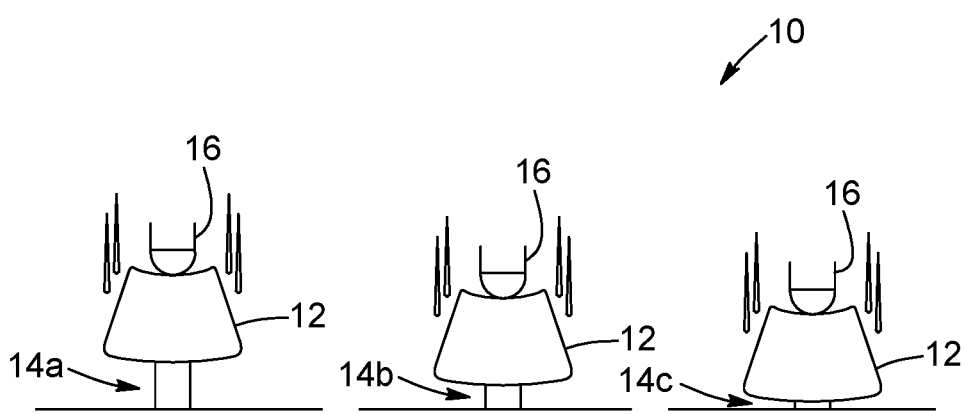

Turning to FIGS. 2a-2c, the displacement 10 of an exemplary physical widget is shown, at three different displacement positions or phases. As object 16 applies a force F to the physical widget 12, said physical widget 12 is displaced. The displacing object 16 may be a finger of a user, for example.

In FIG. 2a, displacement 14a of the physical widget 12 is minimal, indicating that the force F may have just been applied to the physical widget 12. In FIG. 2b, the force F produces a displacement 14 b. The displacement 14b may correspond to a jump phase of the physical widget 12, for example. The jump phase is associated to haptic feedback generated from the activation of the physical widget 12. In other words, the jump phase corresponds to the haptic feedback generated from the clicking action of the physical widget 12. In FIG. 2c, displacement 14c is maximal, corresponding to a bottom-out phase where the physical widget 12 cannot be displaced further, notwithstanding the force applied.

The adaptive friction grain signal according to the non-limiting embodiments described herein below allows for generating haptic feedback representative of, or mimicking, the different phases of displacement 14a-14c of the physical widget 12.

Figure 3:
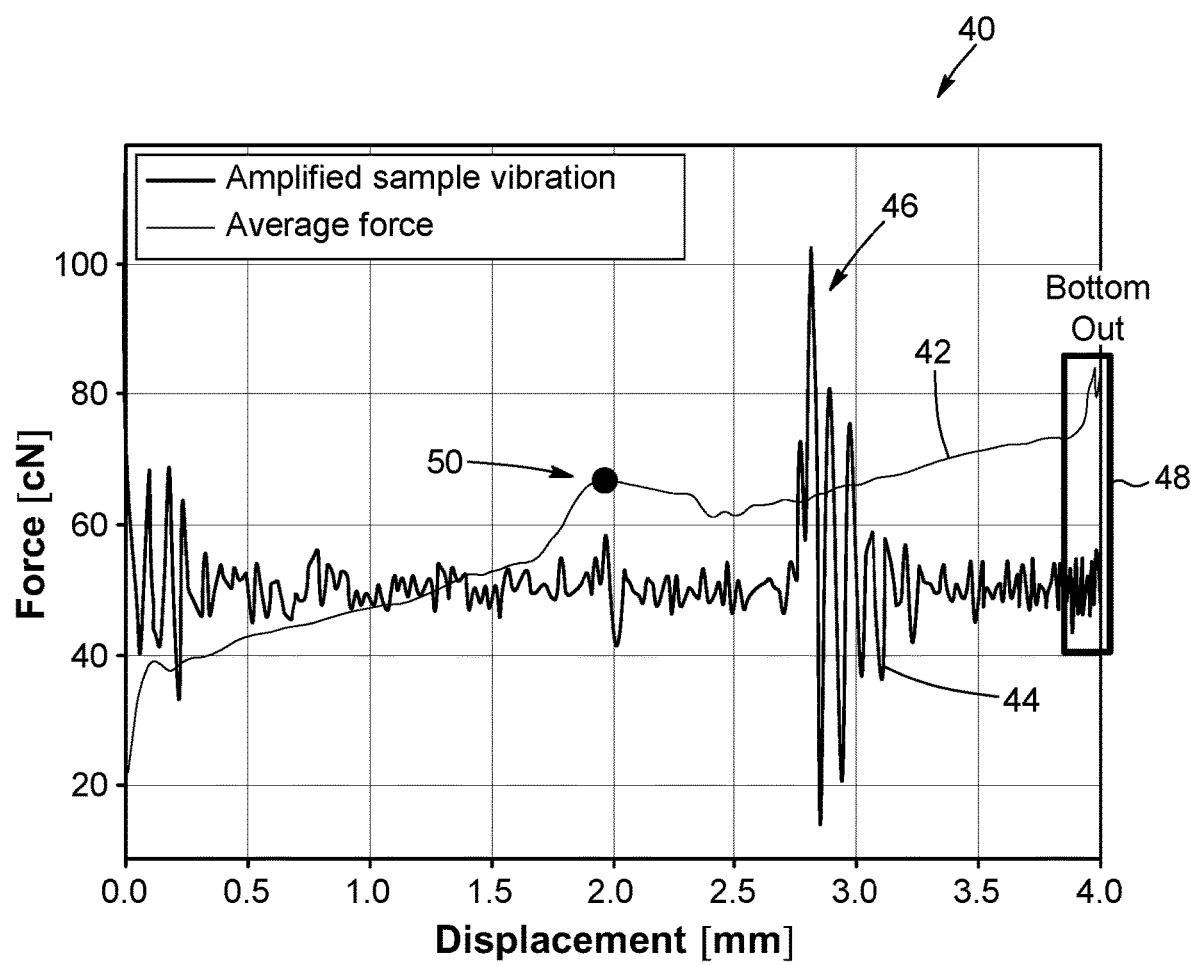
FIG. 3 is a graph of the force (in cN) as a function of displacement (in mm) from data collected from the displacement of a physical widget, according to one embodiment.

Referring now to FIG. 3, an adaptive friction grain signal is advantageously modeled based on a force-displacement curve 42, or force-displacement profile, and vibration-displacement data 44, or vibration-displacement profile, associated with the displacement of a physical widget, so as to generate haptic feedback representative of the displacement of the physical widget. The force-displacement curve 42 and the vibration-displacement data 44 in displacement data graph 40 can be separately acquired and are both functions of the displacement of the physical widget 12. The adaptive friction grain signal is modeled in an automated manner, using the force-displacement curve 42 and the vibration-displacement data 44. In a possible embodiment, acquiring the force-displacement curve 42 and the vibration-displacement data 44 is an automated process.

The force-displacement curve 42 represents a magnitude of force exerted on the physical widget 12 as a function of the displacement of the physical widget 12. That is, the displacement of the widget is associated with a displacing force that is measured. The force-displacement curve 42 includes information representative of various phases associated with the displacement of the physical widget 12. As an example, the force-displacement curve 42 provides information on the magnitude of force required to reach the tactile point 50 of the physical widget 12. The force-displacement curve 42 also provides information on the magnitude of force applied when reaching the bottom-out phase 48. One advantage of modeling the adaptive friction grain signal using the force-displacement curve 42 is that the magnitude of force associated with the bottom-out phase is inherently comprised in the force-displacement curve 42, without needing to explicitly define it. The force-displacement curve 42 provides a variety of information associated with a particular behavior of a physical widget.

Still referring to FIG. 3, the vibration-displacement data 44 represents vibrations generated from displacing the physical widget 12, as a function of the displacement of the widget. The vibration-displacement data 44 includes vibration information associated with the jump phase 46 of the physical widget 12. Furthermore, the vibration-displacement data 44 allows to time (or match) the vibrations generated by the jump phase 46 with a given position of the physical widget 12 during its displacement. The vibration-displacement data 44 also provides vibration information representative of a ratio between vibrations generated during the jump phase 46 of the physical widget 12 and vibrations generated during other phases of the displacement of the physical widget 12. The vibration-displacement data 44 can be an amplitude envelope of the vibrations generated by the displacement of the physical widget 12.

The vibration-displacement data 44 advantageously includes feedback information that is not captured by the force-displacement curve 42. Together, the force-displacement curve or profile 42 and the vibration-displacement data 44 include information allowing for automatically generating the adaptive friction grain signal that is more representative of the real haptic feedback generated by the displacement of a given physical widget. In other possible embodiments, the force-displacement curve (data or profile) and the vibration-displacement curve (data or profile) are created for representing an arbitrary widget. That is, the created force-displacement profile and vibration-displacement profile may not be derived from an existing physical widget. For example, the force-displacement curve and the vibration-displacement data may be created to provide a desired haptic feedback.

Figure 4:
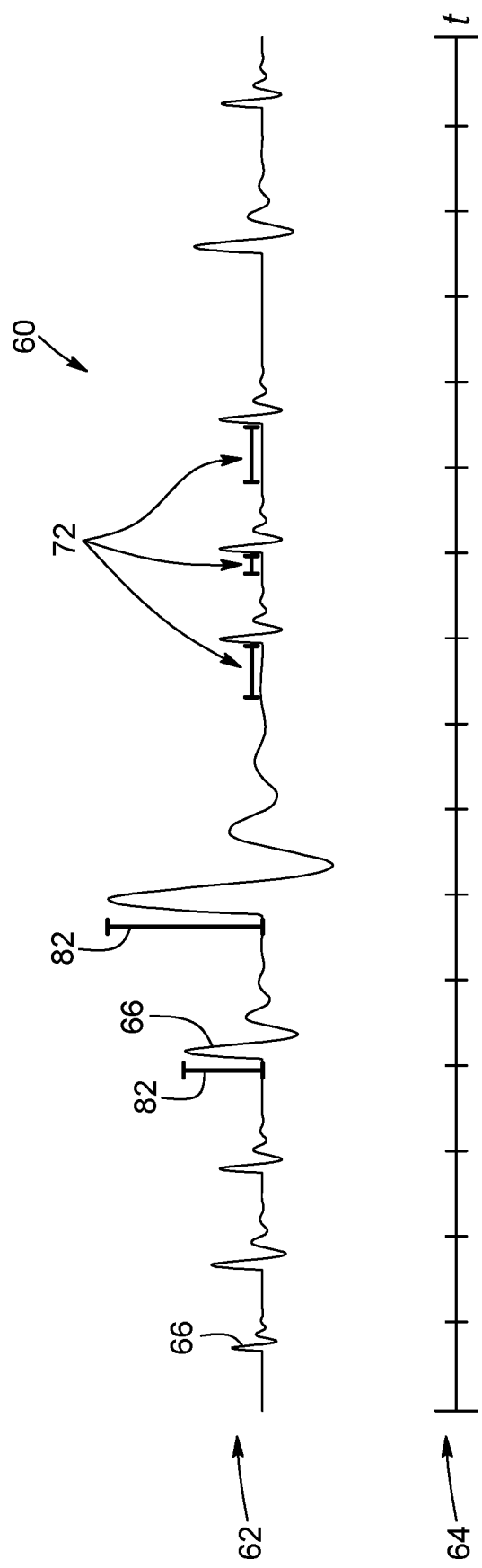
FIG. 4 is a graph representing an adaptive friction grain signal, according to one embodiment.

Referring now to FIG. 4, a possible embodiment of an adaptive friction grain signal 60 modeled from the force-displacement curve 42 and the vibration-displacement data 44 is represented. The fiction grain signal 60 comprises a plurality of grains 66, corresponding to vibration bursts produced when generating the haptic feedback based on the adaptive friction grain signal 60. The adaptive friction grain signal 60 advantageously allows for generating a realistic haptic feedback since it comprises at least one or both of a variable grain density 72 and varying grain amplitudes 82.

In a possible embodiment, the variable grain density 72 and the varying grain amplitudes 82 are automatically set based on the force-displacement curve 42 and the vibration-displacement data 44, respectively. The grain density 72 corresponds to a number of grains for a given time interval. The grain density can also be understood as the temporal spacing between consecutive grains. For example, a denser sequence of grains corresponds to a higher force, while a less dense sequence corresponds to a lower force. The force (or force magnitude) is associated with the force-displacement curve 42. The force-displacement curve 42 can be transformed into grain density information using a transfer function. The grain density 72 of the adaptive friction grain signal 60 is therefore determined from the force-displacement curve 42.

As explained previously, the vibration-displacement data 44 corresponds to the vibration-displacement envelope (i.e. amplitude envelope) which is representative of the vibrations generated from the displacement of the physical widget 12. The grain amplitudes 82 (identified in FIG. 8) are accordingly determined using the vibration-displacement envelope. As a non-limiting example, a given position of the physical widget 12 during its travel can be converted into a given point in time of the adaptive friction grain sequence. The amplitude of a friction grain 66 at a given time of the grain sequence is derived (or extracted) from the amplitude of the envelope at a corresponding travel distance of the physical widget 12.

Using the force-displacement curve 42 and the vibration-displacement data 44 for modeling the adaptive friction grain signal 60 advantageously allows for automatically including details and nuances derived from the applied force and from the vibrations produced during the displacement of the physical widget to the adaptive friction grain signal 60. The force-displacement curve 42 being generally non-linear, this non-linearity is integrated in the adaptive friction grain signal 60, which in turn creates a haptic feedback that more realistically mimics an increasing, or varying, magnitude of force, for example.

Figure 5:
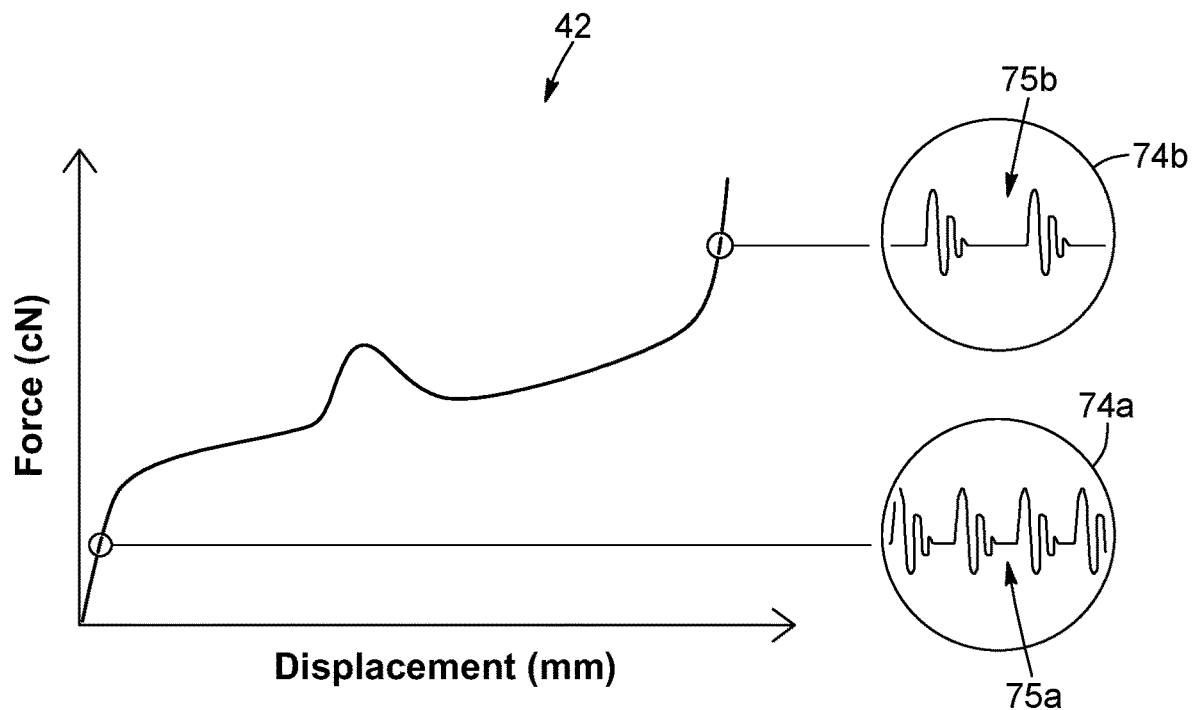
FIG. 5 is a graph representing a sequence of a friction grain signal comprising friction grains of variable density, according to a possible embodiment.

Referring to FIG. 5, segments 74a, 74b of the adaptive friction grain signal 60 are magnified to show that the grain density of the friction grain signal differs from segment 74a to segment 74b. This variable grain density better represents the displacement of a physical widget 12 when pressed, and is derived from the force-displacement data 42. While segments 74a and 74b are shown with constant amplitudes, the amplitude of the grains can also vary. The sequence 74a, corresponding to a small displacement of the physical widget 12, has a higher grain density 75a than grain density 75b of sequence 74b. In possible embodiments, the grain density is proportional to the magnitude of force. It is also contemplated that the grain density can gradually vary over an entire sequence of the friction grain signal, i.e. the grain density for a given segment of the signal may not be fixed. For example, the grain density can be different before and after the jump phase is crossed, or around the bottom-out phase associated to the displacement of a physical widget.

Figure 6:
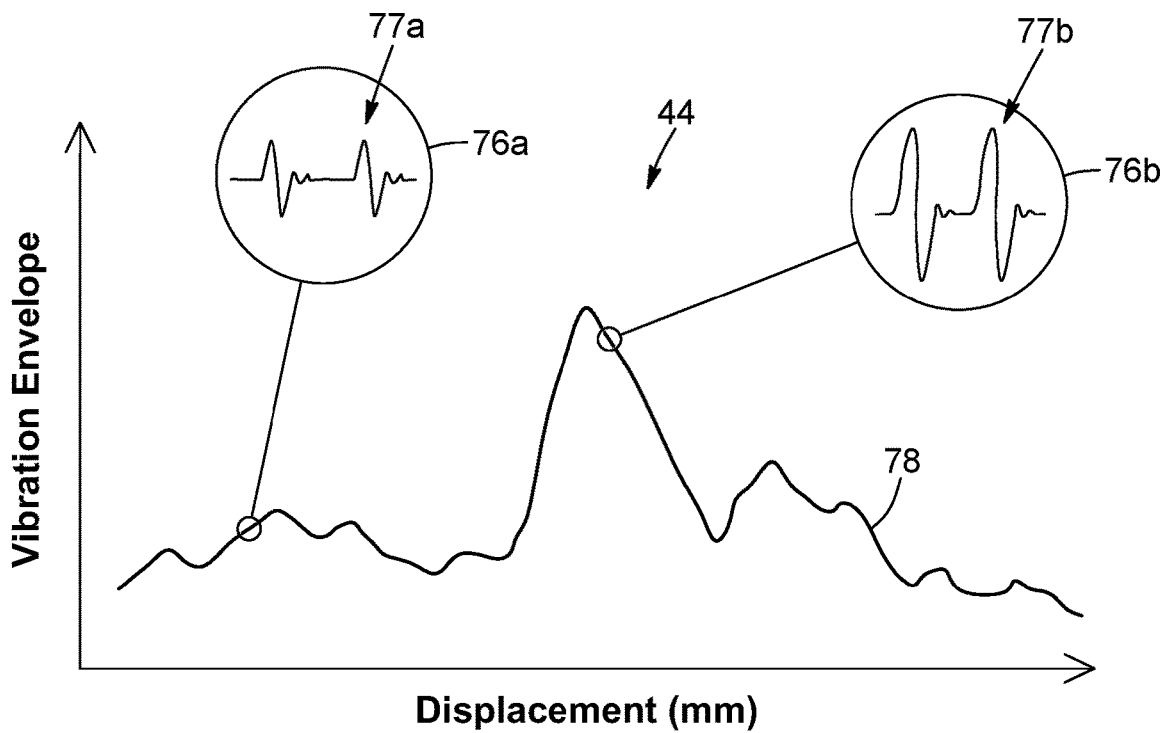
FIG. 6 is a graph representing a sequence of friction grains based on the amplitude envelope of vibration-displacement data, according to a possible embodiment.

Referring to FIG. 6, other possible segments 76a and 76b of the adaptive friction grain signal 60 are illustrated and compared to the amplitude envelope 78 extracted from the vibration-displacement data 44. The amplitude 77a of the sequence 76a is smaller than the amplitude 77b of the sequence 76b, and the grain amplitude is proportional to the amplitude envelope 78, as a possible example only.

Figure 7:
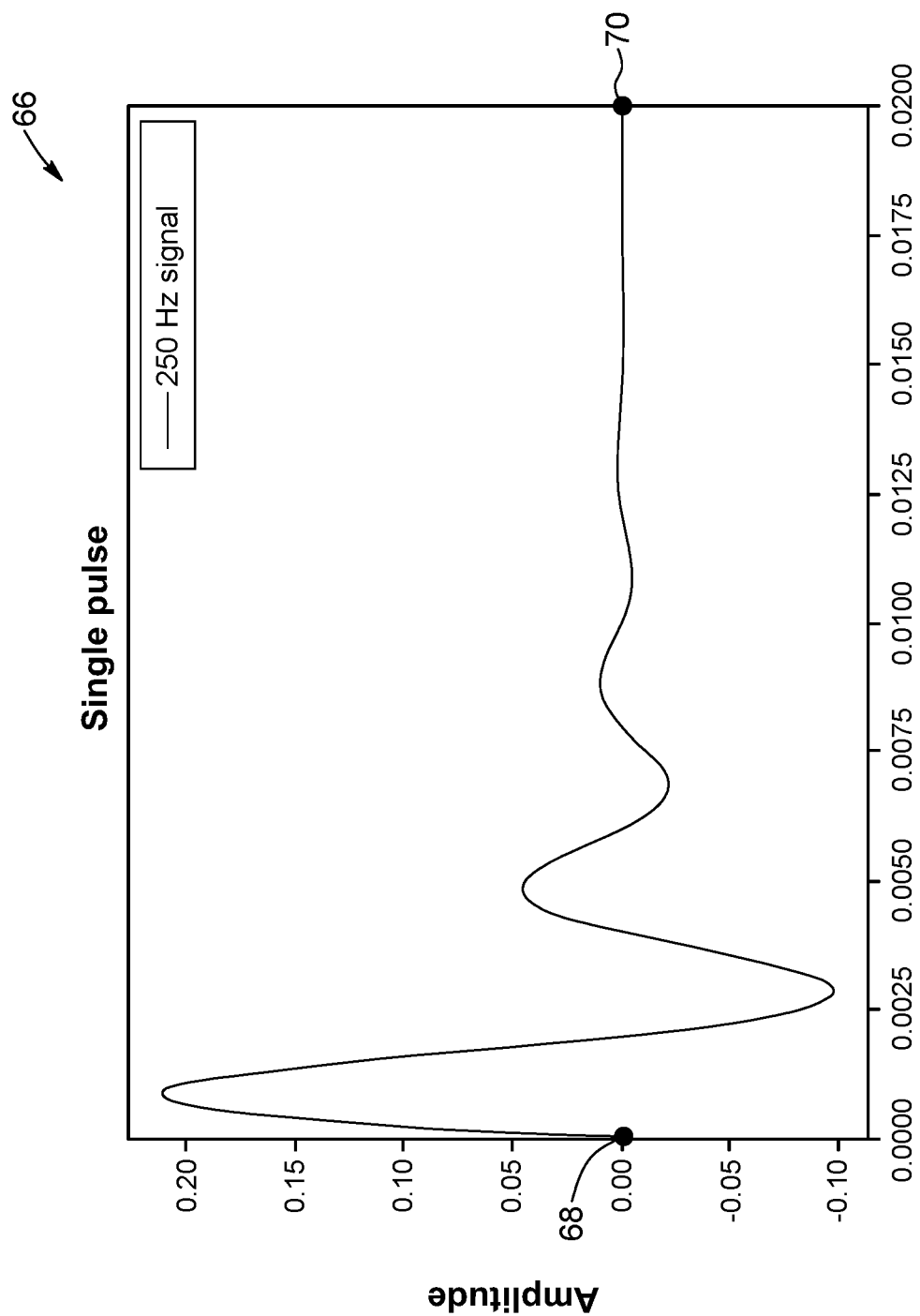
FIG. 7 is a representation of a friction grain, according to a possible embodiment.
Figure 8:
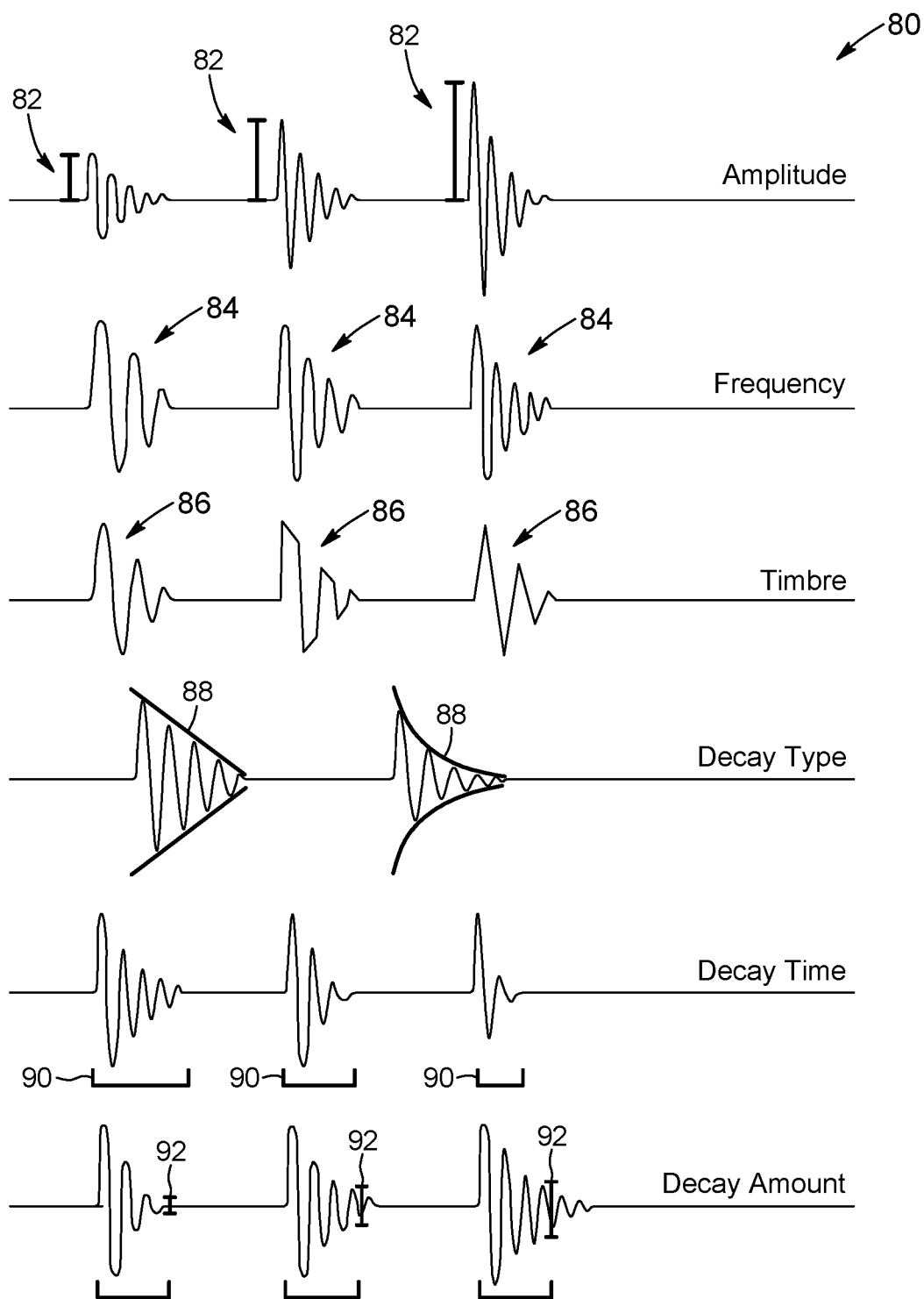
FIG. 8 is representation of six different grain sequences, each sequence comprising three grains, wherein for each grain sequence, a given grain parameter is being modified.

Referring to FIGS. 7-8, each friction grain 66 of the adaptive friction grain signal 60 corresponds to a single pulse that is defined by different grain parameters 80. The grain parameters 80 include the amplitude 82, corresponding to a peak or maximum amplitude of the pulse. The amplitude 82 of each friction grain 66 is determined using the vibration-displacement data 44. The grain parameters 80 further include a grain frequency 84. In some embodiments, a single frequency is selected for all the grains of the adaptive friction grain signal 60. For example, the frequency may be defined with respect to a particular physical widget.

In alternative embodiments, each friction grain 66 may have a respective frequency 84. Further, the selected frequency 84 may be dependent on displacement data acquired from the physical widget 12. The grain parameters 80 also include a timbre 86. The timbre 86 corresponds to a shape of the friction grain 66. For example, the timbre 86 may correspond to a sinusoidal wave, a triangular wave, a square wave, or a saw-tooth wave. In alternative embodiments, other timbres 86 may be used. The grain parameters 80 also include a decay type 88. The decay type is a function defining the decay applied to the pulse. In possible embodiments, the decay type 88 is an exponential function. In alternate embodiments, the decay type 88 may be linear, for example. The grain parameters 80 also include a decay time 90. The decay time 90 corresponds to a time interval between a starting time 68 of the friction grain 66 and an end time 70.

The grain parameters 80 may be further characterized by a decay amount 92. The decay amount corresponds to a reduction to be applied to the amplitude 82 of the friction grain 66 during the decay time 90. For example, in possible embodiments, the decay amount 92 may correspond to 1%, defining that the amplitude 82 of the friction grain 66 is to be reduced to 1% at end point 70. Additional parameters may be defined to characterize the friction grains 66 without deviating from the embodiments described herein.

In a non-limiting embodiment, the frequency 84, timbre 86, decay type 88, decay time 90 and decay amount 92 may be defined or changed, such as via a graphical user interface. In some embodiments, a selection of the grain parameters 80 described above may be provided and associated with a particular type of physical widget. The frequency 84, timbre 86, decay type 88, decay time 90 and/or decay amount 92 may be selected or changed.

In a possible embodiment, the equation defining a friction grain 66 can be provided by:

$$x_{sin} = A * \text{DecayType}(a * x_d) * \text{Timbre}(2 * \pi * f * x_d)$$

In this equation, A corresponds to the amplitude, $x_d$ corresponds to a linearly incrementing displacement value of the physical widget, f is the frequency, and a is a decay function defined by:

$$a = \frac{DecayAmount}{Decay\ time}$$

Figure 9:
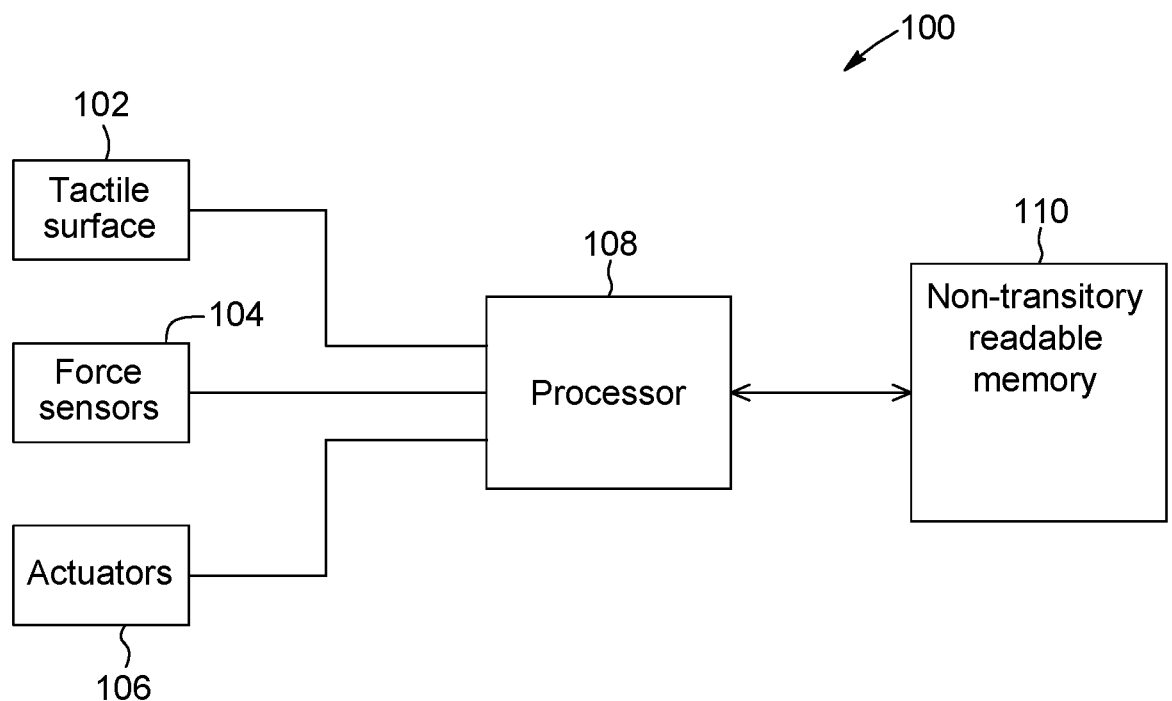
FIG. 9 is a block diagram of a feedback-enabled device, according to a possible embodiment.

Now referring to the non-limiting embodiment of FIG. 9, a feedback-enabled device 100 is provided for generating haptic feedback which creates a sensation of depth as would be felt from displacing the physical widget 12. The feedback-enabled device 100 is provided with a tactile surface 102 for interacting with a user, at least one processor, and a non-transitory readable memory.

The tactile surface 102 can be a touch display allowing for tactile and visual interactions with the user. However, in possible embodiments, the tactile surface may be configured to allow only for tactile interactions with the user without the need for visual interactions. The feedback-enabled device 100 comprises force sensors 104 configured to measure a force exerted onto the tactile surface 102. For example, the force sensors 104 are configured to measure the force applied by a finger of the user interacting with the tactile surface 102. The force sensors 104 can be located underneath the tactile surface 102 relative to the exposed side of the tactile surface 102 on which the force is applied. The force sensors may be provided as part of piezo actuators provided with a force sensing driver. In other possible embodiments, the force exerted on the surface may be collected, measured or inferred from other types of sensors than force sensors.

The feedback-enabled device 100 further comprises actuators 106 configured to generate the haptic feedback on the surface by producing vibration bursts, thus vibrating the tactile surface 102. The vibrations bursts correspond to the friction grains 66 of the adaptive friction grain signal 60. The actuators 106 may be linear resonant actuators, as an example only. The actuators 106 may also be provided as piezo actuators, but other types of actuators can be contemplated.

Figures 10A, 10B:
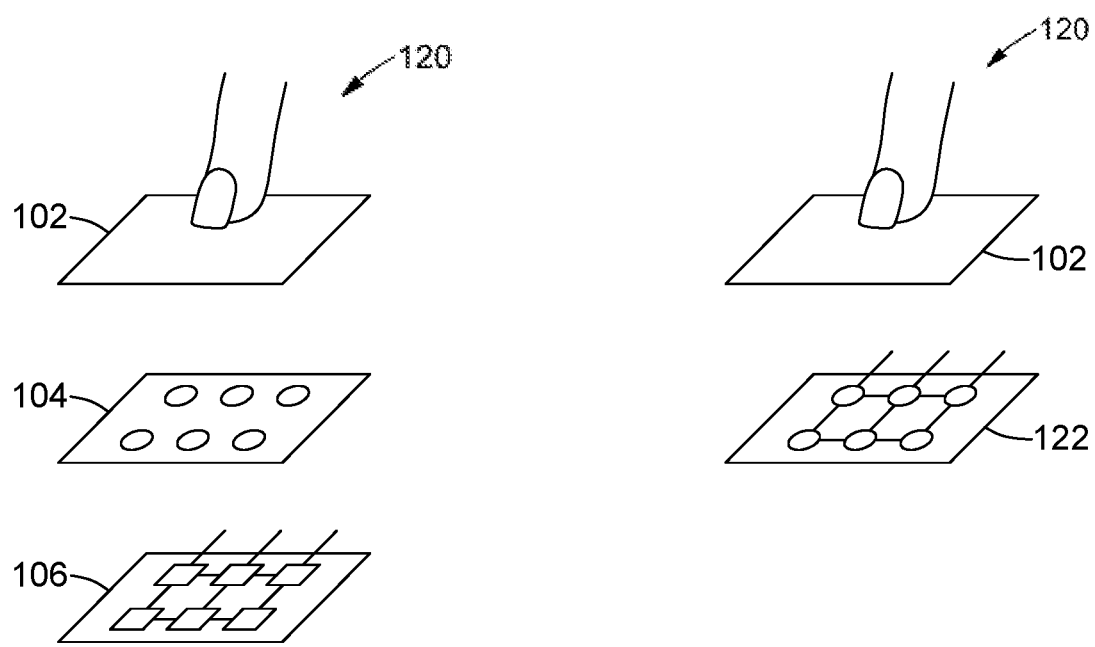
FIG. 10a is a schematic representation of a virtual button, according to a possible embodiment.
FIG. 10b is a schematic representation of a virtual button, according to another possible embodiment.

Referring to the non-limiting embodiment of FIG. 10*a*, the tactile surface 102 together with the force sensors 104 and the actuators 106 form a virtual button 120, with the force sensors 104 and the actuators 106 being located underneath the tactile surface 102. The force sensors 104 and the actuators 106 can be disposed on separate layers, or in other possible embodiments, the force sensors 104 and the actuators 106 may be integrated into one sensing and actuating device 122, such as in shown in FIG. 10*b*. For example, the sensing and actuation device 122 can be a piezo actuator controlled by a force sensing driver.

The feedback-enabled device 100 also comprises a non-transitory readable memory 110. The readable memory 110 is configured for storing the adaptive friction grain signal 60. The readable memory 110 may also store additional data representative of the feedback generated from a physical widget. For example, the readable memory 110 may store the force-displacement curve 42 and the vibration-displacement data 44, or alternatively vectorized data corresponding to force-displacement curve 42 and/or vibration-displacement data 44 for generating theadaptive friction grain signal 60. In other words, the friction grain model(s) may be stored in memory of the haptic feedback device, but not necessarily. It is also possible to keep in memory the force-displacement data and the vibration-data, so as to able to derive "on the fly" the adaptive friction grain signal. It is also possible to keep in memory the different parameters characterizing grains of the adaptive friction grain signal, enabling the processor to send actuating commands to the actuators, based on the stored grain parameters and/or vectorized data.

The feedback-enabled device 100 further comprises one or more processor(s) 108. The processor 108 is operatively connected to the force sensors 104, the actuators 106 and the readable memory 110. The readable memory 110 comprises executable instructions that are executed by the processor 106 for performing the method described herein. The actuators produce vibration burst corresponding to the friction grains 106 contained in the signal, to create the haptic feedback that mimics the sensation of depth representative of the sensation felt when displacing a physical widget.

Figure 11B:
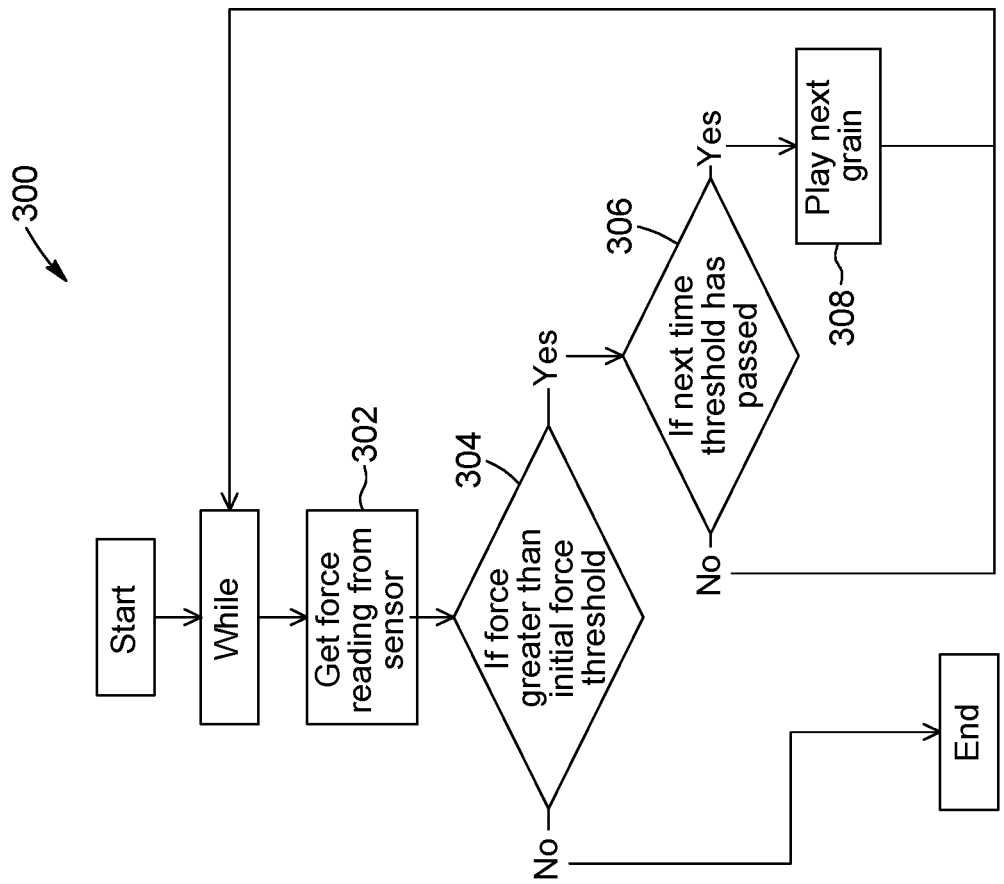
FIG. 11b is a flowchart of a method for generating haptic feedback, according to another embodiment.
Figure 11A:
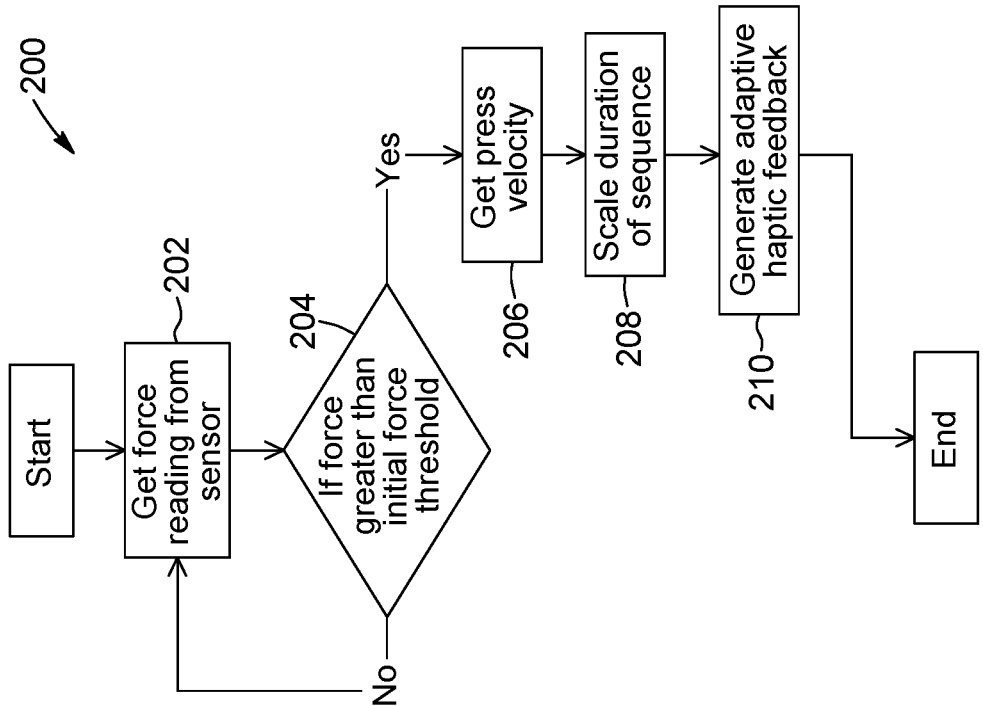
FIG. 11a is a flowchart of a method for generating haptic feedback, according to a possible embodiment.
Figure 11C:
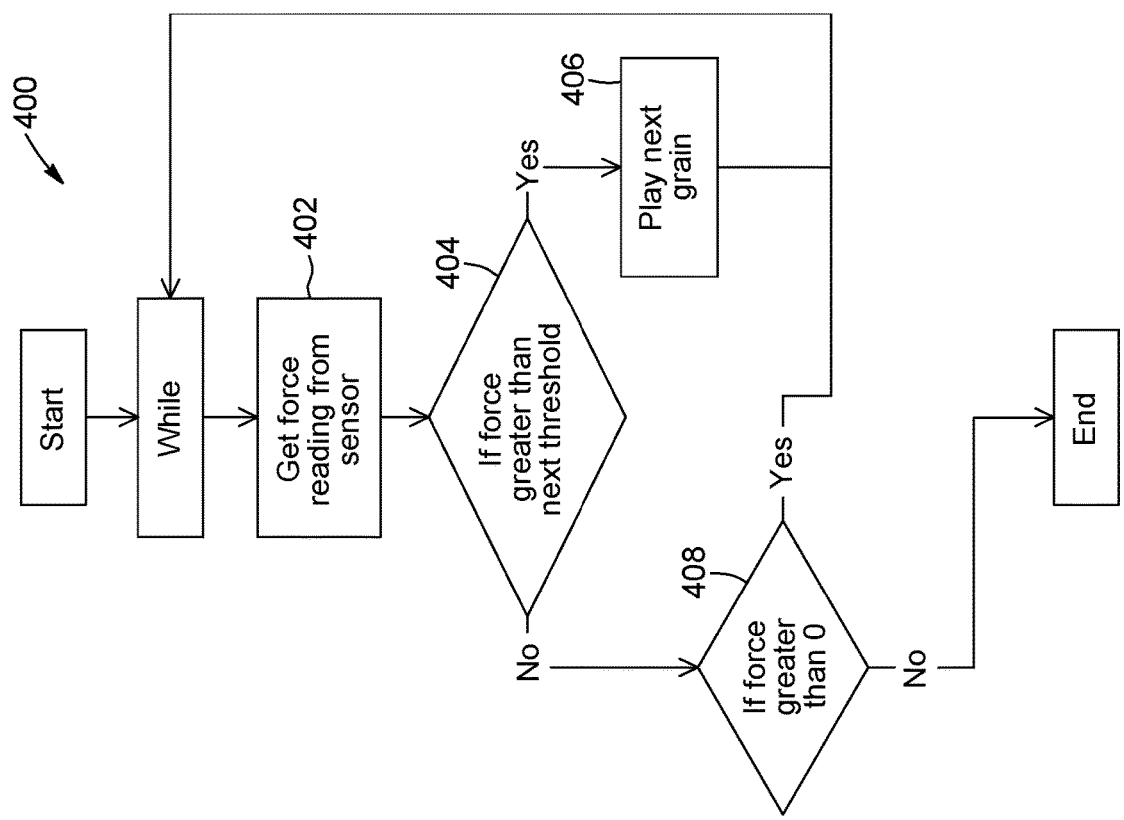
FIG. 11c is a flowchart of a method for generating haptic feedback, according to another embodiment.

Referring to the non-limiting embodiments of FIGS. 11*a*-11*c*, different embodiments of processes 200, 300 and 400 for producing haptic feedback on a device, or feedback-enabled device, are described. Any one or combinations of methods 200, 300 and 400 may be performed on the feedback-enabled device.

Referring to FIG. 11*a*, the method 200 comprises a step 202 of measuring a force applied on the tactile surface. The force can measured once, periodically or continuously, by the force sensor(s) 104. At step 204, the measured force is compared to an initial force threshold. The initial force threshold may be set with respect to physical constraints, precisions, or limits of the tactile surface, the force sensors, and/or to the feedback-enabled device. In some embodiments, the initial force threshold may be predefined or set manually, via a graphical user interface. When the measured force is lower than the initial force threshold, the process may go back to the step of measuring the force applied on the tactile surface 102 (step 202). When the measured force exceeds the initial force threshold, the velocity is calculated at step 206. The velocity corresponds to the speed at which an object is exerting the force applied to the tactile surface 102. The velocity can be calculated based on multiple measurements of the force applied to the tactile surface 102.

At step 208, a sequence of the adaptive friction grain signal 60 used for generating haptic feedback is scaled based on the calculated velocity. In other words, the duration of the sequence is adjusted with respect to the calculated velocity. Adjusting the duration advantageously adapts the sequence according to the force applied to the tactile surface 102. The sequence of the adaptive friction grain signal 60 can thus be shortened or lengthened, keeping a same number of friction grains 66 as in the un-scaled/original sequence. In alternative embodiments, friction grains 66 may be removed or added to the sequence to maintain an appropriate haptic feedback perception. In some embodiments, the duration of the sequence is proportional to the calculated velocity at step 206. In yet other embodiments, the duration of the sequence may also be proportional to the measured force. In yet other embodiments, steps 206 and 208 may be skipped, and the grain sequence of the signal is simply played or actuated when the initial force threshold is met. The adaptive haptic feedback is generated (step 210) by producing the vibrations bursts, corresponding to the friction grains 66, based on the sequence of the adaptive friction grain signal 60. Generating the adaptive haptic feedback may imply, in some cases, the playback of all the vibration bursts of the sequence. In some embodiments, the haptic feedback can be paused or stopped if the measured force is lower than the initial force threshold. For example, the haptic feedback can be paused when the measured force is lower than the initial force threshold and be resumed when the measured force subsequently exceeds the initial force threshold. As another example, the haptic feedback can be completely stopped if the measured force is lower than a minimal force threshold or if there is no more force applied, i.e., the measured force is 0.

Referring now to FIG. 11b, the method 300 comprises similar first steps as method 200. In particular, the method 300 comprises a step 302 of measuring a force applied to the tactile surface 102 and a step 304 of comparing the measured force to an initial force threshold. In this embodiment, each friction grain 66 is associated with a time threshold. When the measured force exceeds the initial force threshold, a time threshold associated with the next friction grain 66 of the sequence is compared to a timestamp of the sequence at step 306. When the timestamp exceeds the time threshold, the vibration burst corresponding to the next friction grain 66 is played or actuated at step 308. The method 300 then goes back to step 302, and the force is measured. If, at step 304, the measured force is lower than the initial force threshold, the method 300 ends. If, at step 306, the timestamp does not exceed the time threshold, the method 300 reverts back to step 302.

Referring now to the non-limiting embodiment of FIG. 11c, each friction grain of the adaptive friction grain signal can be associated with a force threshold. In some embodiments, the successive force thresholds are gradually increasing. In other embodiments, successive force thresholds may vary according to the force-displacement curve 42, for example. At step 402, a force applied to the tactile surface 102 is measured. The measured force is compared to a force threshold corresponding to a next friction grain 66 of the sequence at step 404. When the measured force exceeds the force threshold, a vibration burst corresponding to the next friction grain is produced at step 406. The method then goes back to measuring the force at step 402. When, at step 404, the measured force is lower than the force threshold, the measured force is then compared to an initial force threshold at step 408. In a preferred embodiment, the initial force threshold is 0. In alternative embodiments, another value for the initial force threshold may be selected. If the measured force exceeds the initial force threshold, the method 400 goes back to step 402 and if the measured force is lower than the initial force threshold, the process 400 stops.

Figure 12:
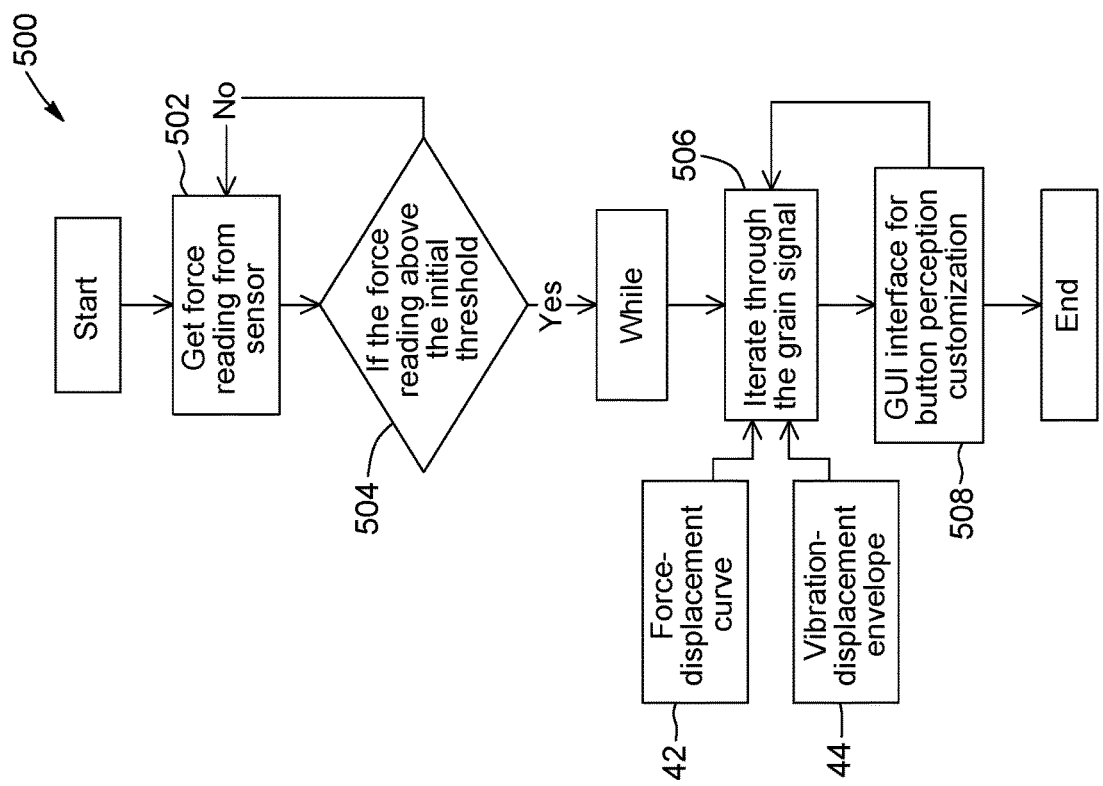
FIG. 12 is a flowchart of a method for generating haptic feedback, according to another embodiment.

Referring now to the non-limiting embodiment of FIG. 12, a general overview of the method for generating an adaptive friction grain signal is provided, for producing haptic feedback on a device. The method 500 comprises a step 502 of measuring a force applied on the tactile surface 102. At step 504, the measured force is compared to an initial threshold. When the measured force exceeds the initial threshold, the method iterates through the adaptive friction grain signal at step 506. In this non-limiting embodiment, the step 506 comprises using the force-displacement curve 42 and the vibration-displacement data 44 to model the friction grains 66. That is, the sequence of the adaptive friction grain signal 60 is automatically modeled by the processor 108 in real-time based on a previously acquired force-displacement curve 42 and vibration-displacement data 44, and the adaptive haptic feedback is generated by producing the vibration bursts of the modeled friction grains 66. Vectorized data for both the force-displacement curve 42 and the vibration-displacement data 44 can be used to model the friction grains 66 of the adaptive friction grain signal 60. At step 508, the adaptive friction grain signal 60 may be altered using a user interface 130, as shown in FIG. 13.

Figure 13:
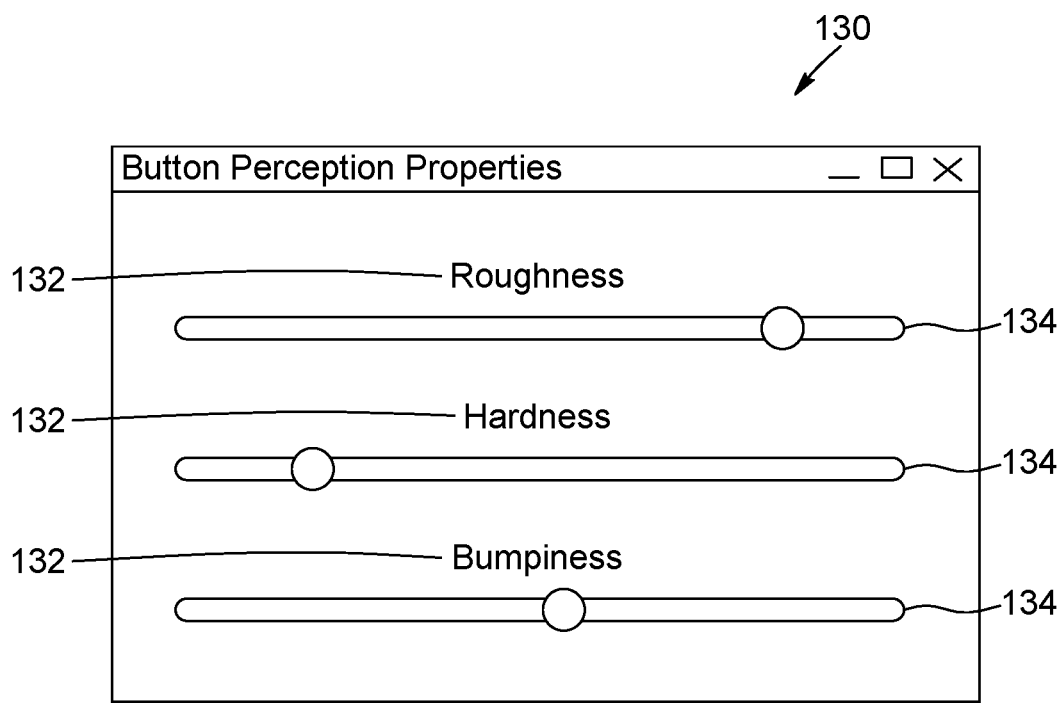
FIG. 13 is a representation of a user interface, according to a possible embodiment.

Referring now to FIG. 13, a user interface 130 is illustrated, according to a non-limiting embodiment. The user interface 130 comprises sliders 134 for controlling parameters 132. The parameters alter the friction grain signal, which in turn will alter the feedback perceived by the user as the vibration bursts are played or actuated. In a non-limiting embodiment, the parameters 132 include roughness, hardness, bumpiness, friction and stiffness, for example. In other embodiments, the parameters 134 may correspond directly to the grain parameters 80. In a possible embodiment, the parameters 132 can each alter one or more grain parameters 80.

Figure 14:
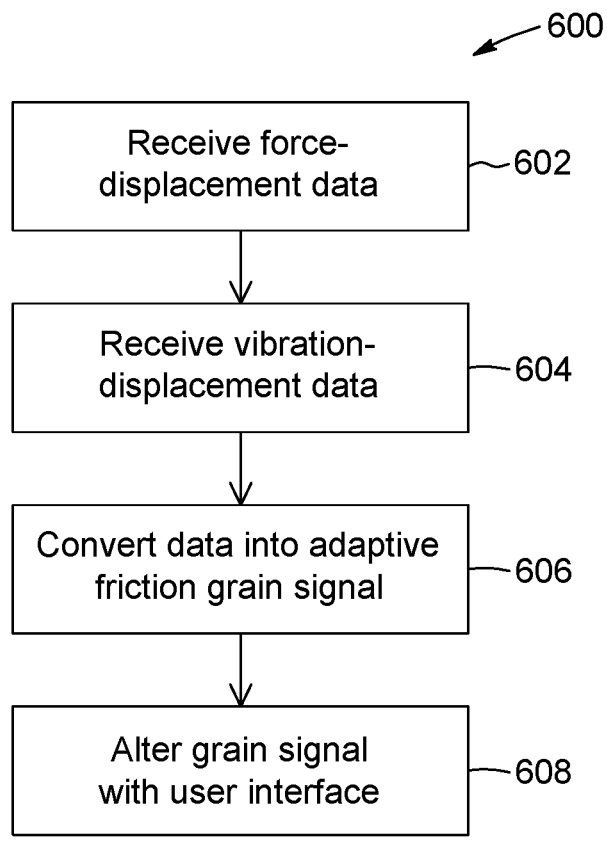
FIG. 14 is a flowchart of a method of generating an adaptive friction grain signal, according to possible embodiment.

Referring now to FIG. 14, a method 600 for generating an adaptive grain signal is provided. The generation of the adaptive friction grain signal 60 optionally comprises receiving the force-displacement curve 42 at step 602. In a non-limiting embodiment, the force-displacement curve 42 is received as vectorized data of the magnitude of force as a function of the displacement of the physical widget. The method 600 optionally further comprises receiving the vibration-displacement data 44 at step 604. In a non-limiting embodiment, the vibration-displacement data 44 is received as vectorized data of the amplitude envelope as a function of the displacement of the physical widget. At step 606, the adaptive friction grain signal 60 is initially obtained. In some embodiments, the initially obtained adaptive friction grain signal 60 is a default or generic adaptive friction grain signal. In alternative embodiments, the adaptive friction grain signal is generated from at least one of or both of the force-displacement curve 42 and the vibration-displacement data 44. In a non-limiting embodiment, the adaptive friction grain signal 60 is modeled and stored in the non-transitory readable memory 110. At step 608, the adaptive friction grain signal 60 is altered using the user interface 130, allowing for changing the perception of the haptic feedback generated based on the adaptive friction grain signal 60.

In the foregoing description, a device and a method for generating haptic feedback on the device have been described. The method advantageously allows for automatically modeling an adaptive friction grain signal comprising friction grains, or vibration bursts, that generate haptic feedback when actuated using actuators. The adaptive friction grain signal is modeled using data from a physical widget and includes a variable grain density and varying grain amplitudes, allowing for creating a realistic feedback as would be felt by a user displacing the physical widget. Various non-limiting methods have been described for generating the haptic feedback on the device, and an exemplary device has also been described.

Several alternative embodiments and examples have been described and illustrated herein The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof.

The present examples and embodiments, therefore, are to be considered in all respects as illustrative and not restrictive, and the invention is not to be limited to the details given herein. Accordingly, while specific embodiments have been illustrated and described, numerous modifications may be possible. The scope of the invention is therefore intended to be limited solely by the scope of the appended claims.

The invention claimed is:

1. A method, comprising:
vibrating a tactile surface by producing vibration bursts based on a sequence of an adaptive friction grain signal, the adaptive friction grain signal comprising a plurality of grains corresponding to the vibration bursts, each grain being defined by a grain amplitude, the adaptive friction grain signal having a grain density that is variable over the sequence of the adaptive friction grain signal, the grain density corresponding to a number of grains during a given time interval, wherein the adaptive friction grain signal is derived from force-displacement data representing a magnitude of force exerted for displacing a physical widget,
wherein the adaptive friction grain signal is further derived from vibration-displacement data representing vibrations generated from displacing the physical widget,
the grain density of the adaptive friction grain signal being derived from the force-displacement data, and the grain amplitude being derived from the vibration-displacement data.

2. The method according to claim 1, further comprising:
determining a force exerted on the tactile surface; and
comparing the force to an initial force threshold,
wherein the vibrating of the tactile surface is performed when the force exceeds the initial force threshold.

3. The method according to claim 2, wherein vibrating the tactile surface comprises:
calculating a velocity corresponding to a speed of an object exerting the force on the tactile surface and derived from the force on the tactile surface, and
adjusting a duration of the sequence of the adaptive friction grain signal based on at least one of the force and the velocity, the duration corresponding to a time interval during which the vibration bursts of the sequence of the adaptive friction grain signal are produced.

4. The method according to claim 3, wherein the sequence of the adaptive friction grain signal is scaled as a function of the velocity, prior to producing the vibration bursts.

5. The method according to claim 2, wherein the plurality of grains of the sequence of the adaptive friction grain signal are each associated with respective gradually increasing force thresholds, and wherein vibrating the tactile surface comprises producing the vibration burst of a given grain of the sequence of the adaptive friction grain signal when the force exceeds a force threshold associated with the given grain.

6. The method according to claim 2, comprising pausing the vibrating of the tactile surface when the force falls below the initial force threshold but is greater than a minimum threshold, and resuming the vibrating of the tactile surface when the force raises above the initial force threshold.

7. The method according to claim 2, comprising stopping the vibrating of the tactile surface when the force is less than the initial force threshold.

8. The method according to claim 1, wherein the adaptive friction grain signal causes the vibration bursts to mimic different phases of physical widget displacement, the different phases of physical widget displacement including a jump phase.

9. The method according to claim 8, wherein the grain density of the sequence of the adaptive friction grain signal before the jump phase is different from the grain density after the jump phase, providing a sensation of varying resistance as the tactile surface is being pressed.

10. The method according to claim 1, wherein each grain of the plurality of grains is further defined by at least one of a frequency, a timbre, a decay type, a decay time and a decay amount, so as to provide a haptic feedback distinctive of a given type of physical widget, out of a plurality of physical widget types.

11. A feedback-enabled device, comprising:
a tactile surface provided with actuators for vibrating the tactile surface by producing vibration bursts;
a non-transitory computer readable memory for storing data representative of an adaptive friction grain signal, the adaptive friction grain signal comprising a plurality of grains corresponding to the vibration bursts, each grain of the plurality of grains being defined by a grain amplitude, the adaptive friction grain signal having a grain density that is variable, the grain density corresponding to a number of grains over a given time interval; and
a processor operatively connected to the actuators and to the non-transitory computer readable memory,
the non-transitory computer readable memory comprising executable instructions stored thereon which, when executed, cause the processor to send a sequence of the adaptive friction grain signal to the actuators to produce the vibration bursts based on the sequence of the adaptive friction grain signal, wherein the adaptive friction grain signal is derived from force-displacement data representing a magnitude of force exerted for displacing a physical widget,
wherein the adaptive friction grain signal is further derived from vibration-displacement data representing vibrations generated from displacing the physical widget,
the grain density of the adaptive friction grain signal being derived from the force-displacement data, and the grain amplitude being derived from the vibration-displacement data.

12. The feedback-enabled device according to claim 11, wherein the tactile surface is further provided with sensors for determining a force exerted on the tactile surface, the processor being operatively connected to the sensors, and wherein the non-transitory computer readable memory further comprises instructions to cause the processor to:
compare the force to an initial force threshold; and
send the sequence of the adaptive friction grain signal to the actuators when the force exceeds the initial force threshold.

13. The feedback-enabled device according to claim 12, wherein the non-transitory computer readable memory further comprises instructions to cause the processor to:
calculate a velocity corresponding to a speed of an object exerting the force on the tactile surface, the velocity being derived from the force; and
adjust a duration of the sequence of the adaptive friction grain signal based on at least one of the force and the velocity, the duration corresponding to a time interval during which the vibration bursts of the sequence of the adaptive friction grain signal are produced.

14. The feedback-enabled device according to claim 12, wherein the plurality of grains of the sequence of the adaptive friction grain signal stored in the non-transitory computer readable memory are each associated with respective gradually increasing force thresholds, and wherein the non-transitory computer readable memory further comprises instructions to cause the processor to send a segment of the adaptive friction grain signal comprising a given grain when the force exceeds a force threshold associated with the given grain.

15. The feedback-enabled device according to claim 12, wherein the non-transitory computer readable memory further comprises instructions to pause activation of the actuators when the force falls below the initial force threshold but is greater than a minimum threshold, and to resume the activation of the actuators when the force raises above the initial force threshold.

16. The feedback-enabled device according to claim 12, wherein the sensors and the actuators are combined in piezo-actuators which combine functions of force measurement and surface vibration.

17. The feedback-enabled device according to claim 11, wherein the adaptive friction grain signal causes the actuators to mimic different phases of physical widget displacement, the different phases of the physical widget displacement including a jump phase.

18. The feedback-enabled device according to claim 11, wherein a haptic feedback generated by the feedback-enabled device creates a sensation of depth as would be felt from displacing the physical widget.

* * * * *